United States Patent [19]
Homfeldt et al.

[11] Patent Number: 5,620,290
[45] Date of Patent: Apr. 15, 1997

[54] GROUND RETAINER

[75] Inventors: Kent Homfeldt, Elgin; Barth Leatherman, St. Charles, both of Ill.; James Langford, Port Washington, Wis.

[73] Assignee: Illinois Tool Works Inc., Glenview, Ill.

[21] Appl. No.: 518,252

[22] Filed: Aug. 23, 1995

[51] Int. Cl.⁶ .............................. F16B 39/24; H01R 4/26
[52] U.S. Cl. ....................... 411/533; 411/162; 411/163; 411/165; 439/433; 439/434
[58] Field of Search .................................. 411/160, 161, 411/162, 163, 164, 165, 533, 957, 959, 368, 369, 370, 525, 526, 527; 439/433, 434, 868, 883

[56] References Cited

U.S. PATENT DOCUMENTS

| | | | |
|---|---|---|---|
| 1,547,162 | 8/1925 | Bohlman . | |
| 1,784,142 | 12/1930 | Hasking | 411/957 |
| 1,924,695 | 8/1933 | Olson | 411/165 |
| 1,963,800 | 6/1934 | Olson | 411/165 |
| 2,250,050 | 7/1941 | Olson | 411/957 |
| 2,297,261 | 9/1942 | Thode | 411/957 |
| 2,342,910 | 8/1944 | Tinnerman | 85/5 |
| 2,492,115 | 6/1949 | Crowther | 85/5 |
| 2,541,096 | 4/1951 | Poupitch | 151/37 |
| 2,631,633 | 3/1953 | Peckham | 411/163 |
| 2,747,166 | 12/1958 | Hoffarth | 339/5 |

*Primary Examiner*—Steven N. Meyers
*Assistant Examiner*—Robert G. Santos
*Attorney, Agent, or Firm*—Schwartz & Weinrieb

[57] ABSTRACT

A snap-on ground retainer for a fastener of the type having a shank, the shank having a head at one end and a threaded portion along its length. The ground retainer comprises a relatively thin sheet metal and includes a washer-like member having an external annular body portion and an inner tooth portion, the inner tooth portion comprises a plurality of circumferentially spaced teeth extending radially inwardly from an inner margin of the washer-like member. The plurality of circumferentially spaced teeth comprise a plurality of resilient retaining teeth and a plurality of rigid grounding teeth, an inner diameter defined by the rigid grounding teeth is slightly larger than a maximum diameter of the threaded portion on the fastener and an inner diameter defined by the resilient retaining teeth is slightly smaller than a maximum diameter of the threaded portion on the fastener with which the ground retainer is adapted to be telescopically associated. The resilient retaining teeth are deflectable for permitting passage of the ground retainer over the threaded portion onto the fastener to seat on the shank and are rigid enough to prevent the ground retainer from being easily detached from the fastener, wherein the ground retainer is attached to the fastener after the threaded portion of the fastener has been inserted through an apertured plate member thereby preventing dislodgment of the fastener from the plate member. The rigid grounding teeth are twisted to enable them to engage with an adjacent upper surface and an adjacent lower surface when the fastener is tightly secured to the lower surface thereby creating and maintaining an electrical connection between the upper and lower surfaces.

20 Claims, 1 Drawing Sheet

GROUND RETAINER

BACKGROUND OF THE INVENTION

1. Field of the Invention

The present invention relates generally to retainers and grounding washers for fastening devices such as screws, and more particularly to a thin sheet metal, washer-like fastener which may be telescopically associated with the shank of a fastener after the fastener has been inserted through an apertured workpiece, so as to prevent dislodgment of the fastener from the workpiece. Furthermore, the fastener may then be tightly secured to a base housing, so as to provide an electrical ground connection between surfaces adjacent to the washer-like fastener.

2. Description of the Prior Art

A variety of retaining devices have been developed to hold fasteners onto a workpiece. Such retaining devices typically serve their purpose to keep the fasteners from falling out of the workpiece and therefore making it easier for one to install and remove the workpiece from a base housing unit. It would be difficult for one to install a workpiece in a remote location, such as in a box on top of a telephone pole, if the fasteners were small in size and were not retained on the workpiece. It would be even more difficult to install the workpiece if the installer needed to wear gloves or use one hand to install the device in a remote location, and therefore a variety of retaining devices have been developed. However, these retaining devices do not have the reliability of providing a solid electrical ground contact to adjacent upper and lower surfaces.

When an electrical workpiece or a circuit board is attached to a base housing unit, such electrical workpiece may be required to be electrically grounded, and therefore a wire leading from the electrical workpiece is typically used to connect the workpiece to the grounded base housing unit in order to ground the electrical workpiece. Connecting and disconnecting such wires can be very cumbersome and difficult to deal with, especially if the electrical workpiece is small in size and if the electrical workpiece is being installed in a remote inconvenient location.

OBJECTS OF THE INVENTION

It is an object of the present invention to provide a washer device that can retain a fastener on an electrical workpiece prior to installation, and to also provide a solid reliable electrical ground connection between the electrical workpiece and the associated base housing unit when the electrical workpiece is attached thereto, so as to therefore provide easy installation of the electrical workpiece while also providing electrical grounding to the electrical workpiece. A further object is to provide a washer device that does not damage the threads of the fastener or the surfaces adjacent thereto.

The foregoing and other types of washers disclosed in the prior art do not offer the flexibility and inventive features of our ground retainer. As will be described in greater detail hereinafter, the ground retainer of the present invention differs from those previously proposed.

It therefore would be desirable to provide a low cost washer that can be retained on a fastener to prevent dislodgment of the fastener from an associated workpiece that is to be secured by the fastener and to further provide a solid electrical connection between surfaces adjacent to the washer.

SUMMARY OF THE INVENTION

According to the present invention we have provided a snap-on ground retainer for a fastener of the type having a shank, the shank having a head at one end and a threaded portion along the length of the shank. The ground retainer comprises a relatively thin sheet metal, washer-like member having an external annular body portion and an inner tooth portion. The inner tooth portion comprises a plurality of circumferentially spaced teeth extending radially inwardly from an inner margin of the washer-like member. The plurality of circumferentially spaced teeth comprise a plurality of resilient retaining teeth and a plurality of grounding teeth, the inner diameter defined by the grounding teeth is slightly larger than the maximum diameter of the threaded portion on the fastener and the inner diameter defined by the resilient retaining teeth is slightly smaller than the maximum diameter of file threaded portion on the fastener with which the ground retainer is adapted to be telescopically associated. The resilient retaining teeth are deflectable for permitting passage of the ground retainer over the threaded portion of the fastener so as to seat on the shank and are rigid enough to prevent the ground retainer from being easily detached from the fastener, wherein the ground retainer is attached to the fastener after the threaded portion of the fastener has been inserted through an aperture in a plate member thereby preventing dislodgment of the fastener from the plate member. The grounding teeth are axially deflected or twisted to enable the grounding teeth to engage with an adjacent upper surface member and an adjacent lower surface member when the fastener is telescopically engaged with the ground retainer and is tightly secured to the lower surface member thereby creating and maintaining an electrical connection between the upper and lower surface members.

Another feature of our invention relates to the snap-on ground retainer described above, wherein the resilient retaining teeth are flat in relationship to the external annular body portion. Additionally, the grounding teeth are axially deflected or twisted in one uniform direction to enable the twisted or deflected portions of the grounding teeth to bite into the adjacent upper and lower surfaces while being tightly secured into place and to create a "spring" in the assembled joint to reduce the potential of inadvertent axial separation of the threaded fastener from the workpiece when in a clamped position.

Still another feature of our invention concerns the snap-on ground retainer, wherein the resilient retaining teeth and the grounding teeth are circumferentially spaced in an alternating manner.

According to important features of our invention we have also provided a snap-on ground retainer as described above, wherein the resilient retaining teeth are of a decreased axial thickness as compared with the thickness of the external annular body portion so as to provide additional flexibility to the resilient retaining teeth.

DESCRIPTION OF THE DRAWINGS

Various objects, features and attendant advantages of the present invention will become more fully appreciated and more readily apparent from the following detailed description, when considered in connection with the accompanying drawings, in which like reference characters designate like or corresponding parts throughout the several views, and wherein.

DESCRIPTION OF THE PREFERRED EMBODIMENTS

Figure 1:
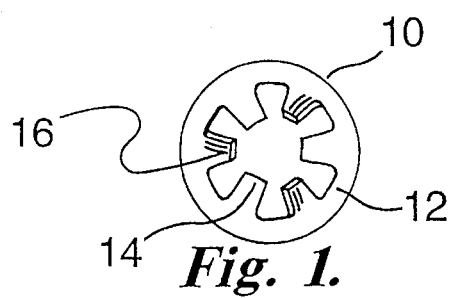
FIG. 1 is an enlarged plan view of a ground retainer of the type contemplated by the present invention.

Referring now to the drawings, FIG. 1 shows my new and improved ground retainer or washer 10. The ground retainer 10 includes an outer annular body portion 12 which is preferably of substantially continuous form. The ground retainer 10 is comprised of a relatively thin sheet metal or any other suitable material that can provide some resiliency and is electrically conductive to enable an electrical ground connection through the ground retainer or washer 10. The inner margin of the washer 10 comprises a plurality of circumferentially spaced teeth 14, 16 extending radially inwardly. The teeth are comprised of a plurality of resilient retaining teeth 14 and a plurality of grounding teeth 16.

Figure 2:
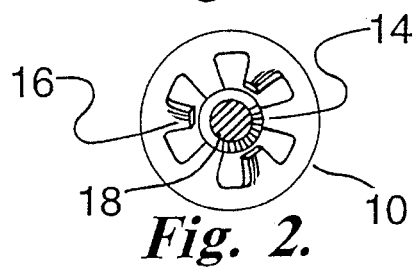
FIG. 2 is an enlarged bottom plan view of a ground retainer of the present invention positioned on a fastener or a screw.
Figure 4:
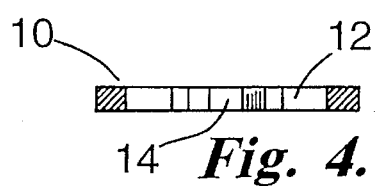
FIG. 4 is a cross sectional view of the ground retainer showing the configuration of one of the flat retaining teeth used in holding the ground retainer on a fastener or a screw.

FIG. 2 further illustrates the placement of the ground retainer 10 onto a fastener or a screw member 18 of the type having a shank with a head at one end and a threaded portion along the length of the shank. The resilient retaining teeth 14 are sized to have an inner diameter slightly smaller than the maximum outer diameter of the threaded screw 18. As the ground retainer 10 is placed onto the threaded screw 18, the resilient retaining teeth 14 are deflectable over the threads of the screw and act to anchor the ground retainer 10 onto the shank of the screw 18 in between the threads without damaging the threads or the ground retainer 10 while further enabling the retaining teeth 14 to maintain their resiliency. The resilient retaining teeth 14 are of equal size and are preferably flat as shown in FIG. 4.

Figure 3:
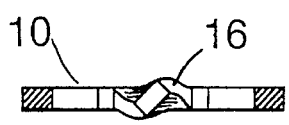
FIG. 3 is a cross sectional view of the ground retainer showing the configuration of one of the twisted teeth used in making a ground connection.

The grounding teeth 16 are twisted or axially deflected as shown in FIG. 3 and are of equal size. The grounding teeth 16 are sized to have an inner diameter slightly larger than the maximum outer diameter of the threaded screw 18 (FIG. 2). The twisted teeth 16 therefore do not come into contact with the threaded screw 18, but act to provide and enhance the electrical ground connection between a housing unit or box 24 and a panel 20 connected to the housing unit 24 when the screw 18 is tightly secured into place. Excellent results can be obtained when the grounding teeth 16 are twisted between 40–50 degrees. It is contemplated that the twisted teeth 16 and the retaining teeth 16 are circumferentially spaced apart in an alternating fashion in order to provide the best results. It is also contemplated that the twisted teeth 16 are axially deflected in one uniform direction to enable the deflected portions to bite into adjacent upper and lower surfaces and to provide the typical spring lock washer effect of such twisted teeth configuration. Excellent results are obtained using three circumferentially spaced resilient teeth 14 and three circumferentially space grounding teeth 16.

Figure 6:
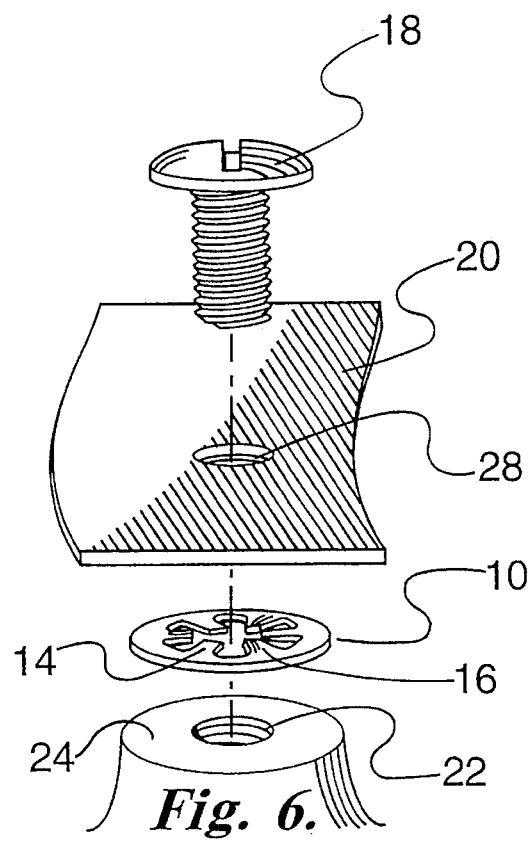
FIG. 6 is an exploded perspective view illustrating the use of a ground retainer of the present invention.
Figure 5:
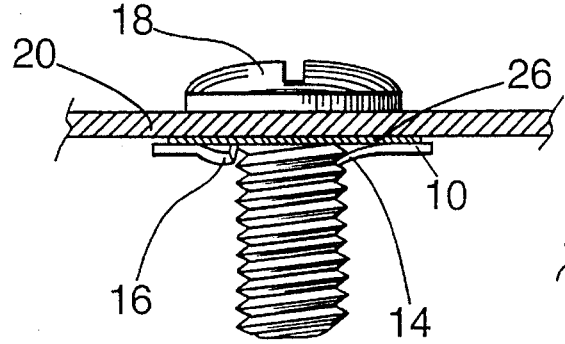
FIG. 5 is an enlarged side elevation illustrating the way in which a ground retainer of the type contemplated by the present invention is initially associated with a fastener or a screw and a workpiece, but showing the workpiece in section.

FIGS. 5 and 6 illustrate the way in which the ground retainer 10 is telescopically associated with the screw 18 and is further used in retaining the screw 18 on an apertured workpiece or a circuit board 20 for eventual placement into a threaded hole 22 located in an electrically conductive housing unit or box 24. The resilient retaining teeth 14 hold the threaded screw 18 to the circuit board 20 adjacent to an electrically conductive layer 26 surrounding the aperture 28 on a bottom side of the circuit board 20.

Figure 7:
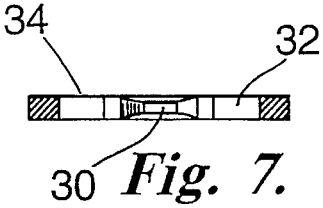
FIG. 7 is a cross sectional view of another embodiment of the ground retainer showing the configuration of one of the flat retaining teeth used in holding the ground retainer on a fastener.

The twisted teeth 16 on the ground retainer 10 preferably have an axial thickness equal to the thickness of the outer annular body portion 12, however, the teeth 16 can have an axial thickness greater the thickness of the outer annular body portion 12 to increase the stiffness of the twisted teeth 16. The resilient teeth 14 also preferably have an axial thickness equal to the thickness of the outer annular body portion 12, however, as seen in FIG. 7, the resilient teeth 30 can have an axial thickness less than the thickness of the outer annular body portion 32 on the ground retainer 34. The thickness of the grounding teeth and the resilient teeth can be increased and/or decreased to conform to: the type of material used to make the ground retainer, the thickness of material used to make the ground retainer, and the size of the ground retainer. Therefore the size and the thickness of the ground retainer may require thinner and/or thicker teeth. Excellent results can be obtained with the ground retainer having a uniform thickness when the ground retainer is very small in size to enable it to work with small mounting screws, such as a ground retainer having a thickness of 0.016 inches and a diameter of 0.26 inches.

In embodiments where the axial thickness of the retaining teeth 14 and grounding teeth 16 are the same, the retaining teeth 14 will be less rigid to deflection in the axial direction of the threaded fastener 18 than the grounding teeth 16 due to the twisted cross section of the grounding teeth 16.

Figure 8:
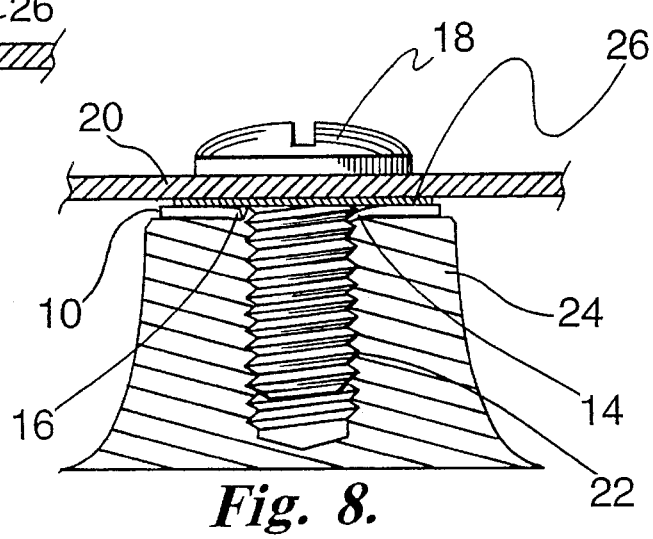
FIG. 8 is an enlarged side elevation similar to FIG. 5 illustrating how the ground retainer is positioned after being secured in final unitary assembly with the associated fastening members.

FIG. 8 illustrates the final assembly using the ground retainer 10. As the screw 18 is tightened into the threaded hole 22, the circuit board 20 is securely fastened into place on the housing unit 24. The ground retainer 10 is positioned in between the electrically conductive layer 26 on the bottom of the circuit board 20 and the electrically conductive housing unit 24 that is grounded. In the tightened position, the twisted grounding teeth 16 creates solid contact between the electrically conductive layer 26 on the circuit board 20 and the electrically conductive grounded housing unit 24, thereby providing a reliable electrical ground to the circuit board 20.

Modifications and variations of the present invention are possible in light of the above teachings. It therefore is to be understood that within the scope of the appended claims, the invention may be practiced otherwise than as specifically described.

What is claimed and desired to be secured by Letters Patent is:

1. A snap-on ground retainer, for use with a fastener comprising a shank having a head at one end and a threaded portion extending along the length of the shank, comprising:

a relatively thin sheet metal, washer-like member having a radially outer annular body portion disposed within a plane, and a radially inner tooth portion comprising a plurality of circumferentially spaced teeth extending radially inwardly from a radially inner margin of said radially outer annular body portion;

said plurality of circumferentially spaced teeth comprising a first set of flat, resiliently flexible retaining teeth, and a second set of grounding teeth;

said first set of flat, resiliently flexible retaining teeth having a first predetermined length defining a first locus, defined by radially innermost portions of said first set of flat, resiliently flexible retaining teeth, having a first diametrical value such that said first set of flat, resiliently flexible retaining teeth are adapted to be engageable with, and deflectable in a first direction by, a threaded portion of a shank of a fastener, when said ground retainer is telescopically associated with a threaded portion of a shank of a fastener, for permitting passage of said ground retainer over a threaded portion of a shank of a fastener in a second relative direction, and yet said first set of flat, resiliently flexible retaining teeth are rigid enough for preventing said ground retainer from being easily detached from a threaded portion of a shank of a fastener by relative movement of said ground retainer with respect to a threaded portion of a shank of a fastener in said first direction after said ground retainer is telescopically associated with a threaded portion of a shank of a fastener; and said second set of grounding teeth having a second predetermined length, which is slightly smaller than said first predetermined length of said first set of flat, resiliently flexible retaining teeth, defining a second locus, defined by radially innermost portions of said second set of grounding teeth having a second diametrical value which is slightly larger than said first diametrical value of said first locus as defined by said radially innermost portions of said first set of flat, resiliently flexible retaining teeth such that said grounding teeth are not adapted to be engageable with a threaded portion of a shank of a fastener when said ground retainer is telescopically associated with a threaded portion of a shank of a fastener, said grounding teeth being axially deflected out of said plane of said annular body portion for enabling said grounding teeth to engage an adjacent upper surface member and an adjacent lower surface member, when a fastener is telescopically associated with said ground retainer and is tightly secured to a lower surface member, and thereby create and maintain an electrical connection between an upper surface member and a lower surface member.

2. The snap-on ground retainer of claim 1, wherein said grounding teeth are axially deflected in one uniform direction to enable deflected portions of the rigid grounding teeth to bite into said adjacent upper and lower surfaces while being tightly secured into place.

3. The snap-on ground retainer of claim 1, wherein said resilient retaining teeth and said rigid grounding teeth are circumferentially spaced in an alternating manner.

4. The snap-on ground retainer of claim 1, wherein said resilient retaining teeth are of a decreased axial thickness as compared with the thickness of the external annular body portion to provide additional flexibility to the resilient retaining teeth.

5. The snap-on ground retainer of claim 1, wherein said grounding teeth are twisted about their respective axes.

6. The retainer as set forth in claim 5, wherein:

said grounding teeth are twisted about said axes between 40°–50°.

7. The retainer as set forth in claim 1, wherein:

said first set of retaining teeth comprises three teeth; and said second set of grounding teeth comprises three teeth.

8. In combination, a fastener system for preventing disengagement of a screw fastener from a workpiece and for providing a good electrical connection between said workpiece and a support member, comprising:

a screw fastener comprising a head portion and a threaded shank portion;

a workpiece having an aperture defined therein through which said threaded shank portion of said screw fastener extends while said head portion of said screw fastener engages a first surface of said workpiece;

a support member having a threaded bore defined therein for threadedly receiving said threaded shank portion of said screw fastener so as to secure said screw fastener within said support member and thereby secure said workpiece upon said support member; and a washer device engaged with said threaded shank portion of said screw fastener so as to prevent disengagement of said screw fastener from said workpiece, and interposed between a second surface of said workpiece and said support member so as to provide a good electrical connection between said workpiece and said support member;

said washer device comprising a relatively thin sheet metal member having a radially outer annular body portion disposed within a plane, and a radially inner tooth portion comprising a plurality of circumferentially spaced teeth extending radially inwardly from a radially inner margin of said radially outer annular body portion;

said plurality of circumferentially spaced teeth comprising a first set of flat, resiliently flexible retaining teeth and a second set of grounding teeth;

a first locus defined by radially innermost portions of said first set of flat, resiliently flexible retaining teeth having a first diametrical value which is slightly smaller than a maximum diameter of said threaded shank portion of said fastener such that said first set of said flat, resiliently flexible retaining teeth are deflected in a first direction by said threaded shank portion of said fastener when said washer device is telescopically mounted upon said threaded shank portion of said fastener as a result of relative movement of said washer device along said threaded shank portion of said fastener in a second relative direction, and yet said first set of said flat, resiliently flexible retaining teeth are rigid enough for preventing said washer device from being easily detached from said threaded shank portion of said fastener by relative movement of said washer device with respect to said threaded shank portion of said fastener in said first direction after said washer device has been mounted upon said threaded shank portion of said fastener and said first set of said flat, resiliently flexible retaining teeth have engaged said threaded shank portion of said fastener; and a second locus defined by radially innermost portions of said second set of grounding teeth having a second diametrical value which is slightly larger than a maximum diameter of said threaded shank portion of said fastener with which said washer device is telescopically associated such that said grounding teeth are not engaged with said threaded shank portion of said fastener, said grounding teeth being axially deflected out of said plane of said annular body portion of said washer device for enabling said grounding teeth to engage said second surface of said workpiece and said support member, when said threaded shank portion of said screw fastener is inserted through said aperture of said workpiece, through said washer device, and tightly threadedly engaged within said threaded bore of said support member, thereby creating and maintaining a good electrical connection between said workpiece and said support member.

9. The combination of claim 8, wherein:

said rigid grounding teeth are axially deflected in one uniform direction so as to enable deflected portions of said grounding teeth to bite into said second surface of said workpiece and said support member while said screw fastener is tightly secured into place within said support member.

10. The combination of claim 9, wherein said resilient retaining teeth and said rigid grounding teeth are circumferentially spaced in an alternating manner.

11. The combination as set forth in claim 8, wherein:

said resilient retaining teeth are of a decreased axial thickness as compared with the thickness of said radially outer annular body portion of said washer device so as to provide additional flexibility to said resilient retaining teeth.

12. The combination as set forth in claim 8, wherein:

said grounding teeth are twisted about their respective axes.

13. The combination as set forth in claim 12, wherein:

said grounding teeth are twisted about said axes between 40°–50°.

14. The combination as set forth in claim 8, wherein:

said first set of retaining teeth comprises three teeth; and
said second set of grounding teeth comprises three teeth.

15. The combination as set forth in claim 8, wherein:

said workpiece comprises a printed circuit board; and
said support member comprises an electrically conductive housing unit.

16. In combination, a fastener system for preventing disengagement of a screw fastener from a workpiece and for providing a good electrical connection between said workpiece and a support member, comprising:

a screw fastener comprising a head portion and a threaded shank portion;

a workpiece having an aperture defined therein through which said threaded shank portion of said screw fastener extends while said head portion of said screw fastener engages a first surface of said workpiece; and a washer device engaged with said threaded shank portion of said screw fastener so as to prevent disengagement of said screw fastener from said workpiece, and adapted to be interposed between a second surface of said workpiece and a support member so as to provide a good electrical connection between said workpiece and a support member when said screw fastener is engaged with a support member;

said washer device comprising a relatively thin sheet metal member having a radially outer annular body portion disposed within a plane, and a radially inner tooth portion comprising a plurality of circumferentially spaced teeth extending radially inwardly from a radially inner margin of said radially outer annular body portion;

said plurality of circumferentially spaced teeth comprising a first set of flat, resiliently flexible retaining teeth, and a second set of grounding teeth;

said first set of flat, resiliently flexible retaining teeth having a first predetermined length defining a first locus, defined by radially innermost portions of said first set of flat, resiliently flexible retaining teeth, having a first diametrical value such that said first set of said flat, resiliently flexible retaining teeth are engageable with, and deflectable in a first direction by, said threaded shank portion of said fastener, when said washer device is telescopically mounted upon said threaded shank portion of said fastener, for permitting passage of said washer device along said threaded shank portion of said fastener in a second relative direction, and yet said first set of flat, resiliently flexible retaining teeth are rigid enough for preventing said washer device from being easily detached from said threaded shank portion of said fastener by relative movement of said washer device with respect to said threaded shank portion of said fastener in said first direction after said washer device has been mounted upon said threaded shank portion of said fastener and said first set of flat, resiliently flexible retaining teeth have engaged said threaded shank portion of said fastener; and said second set of grounding teeth having a second predetermined length, which is slightly smaller than said first predetermined length of said first set of flat, resiliently flexible retaining teeth, defining a second locus, defined by radially innermost portions of said second set of grounding teeth, having a second diametrical value which is slightly larger than said first diametrical value of said first locus as defined by said radially innermost portions of said first set of flat, resiliently flexible retaining teeth such that said grounding teeth are not engaged with said threaded shank portion of said fastener when said washer device is telescopically mounted upon threaded shank portion of said fastener, said grounding teeth being axially deflected out of said plane of said annular body portion of said washer device for enabling said grounding teeth to engage said second surface of said workpiece and a support member, when said threaded shank portion of said fastener is inserted through said aperture of said workpiece, through said washer device, and tightly threadedly engaged within a threaded bore of a support member, and thereby create and maintain a good electrical connection between said workpiece and a support member.

17. The combination as set forth in claim 16, wherein:

said flat, resiliently flexible retaining teeth and said grounding teeth are circumferentially spaced in an alternating manner.

18. The combination as set forth in claim 16, wherein:

said grounding teeth are axially deflected in one uniform direction so as to enable deflected portions of said grounding teeth to bite into said second surface of said workpiece and a support member when said screw fastener is tightly secured into place within a support member.

19. The combination as set forth in claim 16, wherein:

said resilient retaining teeth are of a decreased axial thickness as compared with the thickness of said radially outer annular body portion of said washer device so as to provide additional flexibility to said resilient retaining teeth.

20. The combination as set forth in claim 16, wherein:

said grounding teeth are twisted about their respective axes.

\* \* \* \* \*